(12) United States Patent
Shizu et al.

(10) Patent No.: US 10,063,133 B2
(45) Date of Patent: Aug. 28, 2018

(54) POWER SUPPLY DEVICE AND AIR CONDITIONER

(71) Applicant: Mitsubishi Electric Corporation, Tokyo (JP)

(72) Inventors: Keiichiro Shizu, Tokyo (JP); Hidetoshi Yamakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/550,506

(22) PCT Filed: Mar. 31, 2015

(86) PCT No.: PCT/JP2015/060220
§ 371 (c)(1),
(2) Date: Aug. 11, 2017

(87) PCT Pub. No.: WO2016/157441
PCT Pub. Date: Oct. 6, 2016

(65) Prior Publication Data
US 2018/0034361 A1 Feb. 1, 2018

(51) Int. Cl.
*G05F 3/06* (2006.01)
*H02M 1/32* (2007.01)
(Continued)

(52) U.S. Cl.
CPC ............... *H02M 1/32* (2013.01); *F24F 11/02* (2013.01); *F24F 11/89* (2018.01); *H02M 1/42* (2013.01);
(Continued)

(58) Field of Classification Search
CPC ............ H02M 1/32; H02M 1/42; H02M 1/44; H02M 5/44; H02M 7/12; F24F 11/02
(Continued)

(56) References Cited

U.S. PATENT DOCUMENTS 6,795,322 B2 * 9/2004 Aihara ................ H02J 9/061
307/64
2010/0202169 A1 * 8/2010 Gaboury ............. H02M 1/4225
363/49
(Continued)

FOREIGN PATENT DOCUMENTS

DE 3830460 A1 3/1990
EP 3830460 A1 3/1990
(Continued)

OTHER PUBLICATIONS

International Search Report of the International Searching Authority dated Jun. 23, 2015 for the corresponding international application No. PCT/JP2015/060220 (and English translation).
(Continued)

*Primary Examiner* — Rexford Barnie
*Assistant Examiner* — Jagdeep Dhillon
(74) *Attorney, Agent, or Firm* — Posz Law Group, PLC (57) ABSTRACT

A power supply device includes a first rectifying unit that converts the AC power passed through an input unit into DC power, a power-factor improving unit that improves a power factor of the DC power output from the first rectifying unit, a first power storage unit that stores the DC power passed through the power-factor improving unit and supplies the stored DC power to a load side, a second rectifying unit connected to a portion where the input unit is connected to the AC power supply, the second rectifying unit converting the AC power into the DC power, a second power storage unit that stores the DC power passed through the second rectifying unit, and a control unit that operates using the electric power stored in the second power storage unit and, when a short-circuit failure occurs in the power-factor improving unit, performs control for interrupting the input unit.

7 Claims, 7 Drawing Sheets

(51) Int. Cl.
  *F24F 11/02* (2006.01)
  *H02M 1/42* (2007.01)
  *H02M 1/44* (2007.01)
  *H02M 5/44* (2006.01)
  *F24F 11/89* (2018.01)
  *H02P 27/06* (2006.01)

(52) U.S. Cl.
  CPC .............. *H02M 1/44* (2013.01); *H02M 5/44* (2013.01); *H02P 27/06* (2013.01)

(58) Field of Classification Search
  USPC .................... 307/151, 149, 152, 66, 64, 43; 363/56.01, 37, 49; 361/23, 76, 62, 15, 42
  See application file for complete search history.

(56) References Cited

U.S. PATENT DOCUMENTS

| | | | |
|---|---|---|---|
| 2013/0152624 A1* | 6/2013 | Arisawa | H02M 1/4225 62/467 |
| 2013/0333861 A1 | 12/2013 | Takata | |
| 2013/0334884 A1* | 12/2013 | Arisawa | H02M 3/158 307/43 |
| 2014/0334202 A1* | 11/2014 | Cameron | H02J 5/00 363/56.01 |
| 2015/0372584 A1* | 12/2015 | Hirota | H02M 1/15 363/37 |

FOREIGN PATENT DOCUMENTS

| | | |
|---|---|---|
| EP | 1583402 A1 | 10/2005 |
| JP | 04-008174 A | 1/1992 |
| JP | 04-183272 A | 6/1992 |
| JP | 09-233807 A | 9/1997 |
| JP | 2000-014155 A | 1/2000 |
| JP | 2000-262060 A | 9/2000 |
| JP | 2001-268917 A | 9/2001 |
| JP | 2003-274660 A | 9/2003 |
| JP | 2008-061309 A | 3/2008 |
| JP | 2012-175882 A | 9/2012 |
| JP | 2012-177500 A | 9/2012 |
| JP | 2013-050223 A | 3/2013 |
| JP | 2014-217119 A | 11/2014 |

OTHER PUBLICATIONS

Extended European Search Report dated Apr. 12, 2017 for the corresponding European application No. 15 86 6372.4.

* cited by examiner

POWER SUPPLY DEVICE AND AIR CONDITIONER

CROSS REFERENCE TO RELATED APPLICATION

This application is a U.S. national stage application of International Patent Application No. PCT/JP2015/060220 filed on Mar. 31, 2015, the disclosure of which is incorporated herein by reference.

TECHNICAL FIELD

The present invention relates to a power supply device that receives an input of AC power and drives a load and an air conditioner including the power supply device.

BACKGROUND

As a power supply device that receives an input of AC power and drives an electric motor, there has been a power supply device including one route to which electric power for driving the electric motor is input and another route to which electric power for driving a control unit, which controls the power supply device, is input.

A power supply circuit described in Patent Literature 1 described below includes a first converting unit 11 and a second converting unit 12 that convert an AC voltage into a DC voltage. The second converting unit 12 includes a diode D121. An anode of the diode D121 is connected to between an input line L1 and a switch unit S1. A cathode of the diode D121 is connected to a capacitor C1 that supplies a DC voltage applied to a control unit 22. The second converting unit 12 performs half-wave rectification of an AC voltage and charges the capacitor C1. The power supply circuit can supply operation power to the control unit 22 even after the switch unit S1 becomes nonconductive (paragraph 0050 to paragraph 0051 and FIG. 2).

PATENT LITERATURE

Patent Literature 1: Japanese Patent Application Laid-Open No. 2012-177500

A power supply device that receives an input of AC power and drives an electric motor performs, at high speed, switching of a semiconductor switch element in a power converting unit for driving the electric motor or a power-factor improving unit for reducing power supply harmonics. Therefore, for the purpose of suppression of a leak of harmonic noise to a reception side, the power supply device includes a noise filter in an input unit to which AC power is input. To suppress noise in a normal mode, the noise filter often includes a capacitor that connects terminals of the input unit. The voltage of an AC power supply is directly applied to both ends of the capacitor.

When a short-circuit failure occurs in the semiconductor switch element included in the power-factor improving unit, to protect the electric motor or the power converting unit that drives the electric motor, a switch unit in the input unit is sometimes made nonconductive. At this point, the voltage applied to the capacitor is superimposed on, through a route not passing through the switch unit, a power storage unit for driving the control unit.

At this point, the voltage of the input unit at a point in time when the switch unit becomes nonconductive is directly superimposed on the power storage unit for driving the control unit. Therefore, a maximum voltage applied to the power storage unit for driving the control unit is approximately twice as large as a voltage during a normal operation. Therefore, a withstand voltage of components of the power storage unit for driving the control unit needs to be set to be twice or more as large as the voltage during the normal operation. There is a problem in that an increase in costs is caused.

SUMMARY

The present invention has been devised in view of the above and it is an object of the present invention to obtain a power supply device, the costs of which can be reduced.

In order to solve the above problem, and in order to attain the above object, a power supply device of the present invention includes: an input unit to which AC power is input from an AC power supply; a first rectifying unit that converts the AC power passed through the input unit into DC power; a power-factor improving unit that improves a power factor of the DC power output from the first rectifying unit; a first power storage unit that stores the DC power passed through the power-factor improving unit and supplies the stored DC power to a load side; a second rectifying unit connected to a portion where the input unit is connected to the AC power supply, the second rectifying unit converting the AC power into the DC power; a second power storage unit that stores the DC power passed through the second rectifying unit; and a control unit that operates using the electric power stored in the second power storage unit and, when a short-circuit failure occurs in the power-factor improving unit, performs control for interrupting the input unit.

Advantageous Effects of Invention

The power supply device according to the present invention achieves an effect that it is possible to reduce costs.

DETAILED DESCRIPTION

Power supply devices and an air conditioner according to embodiments of the present invention are explained in detail below with reference to the drawings. Note that the present invention is not limited by the embodiments.

First Embodiment

Figure 1:
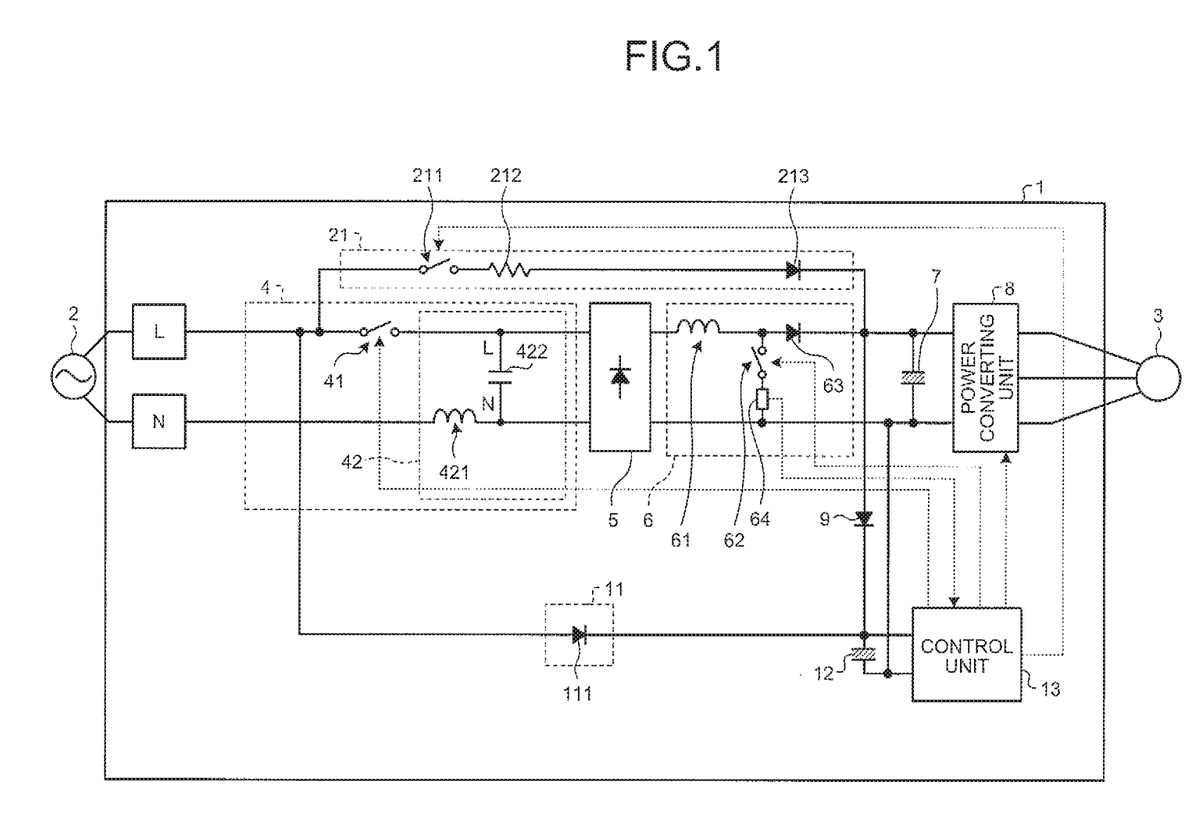
FIG. 1 is a diagram showing the configuration of a power supply device according to a first embodiment.

FIG. 1 is a diagram showing the configuration of a power supply device according to a first embodiment. A power supply device 1 converts AC power supplied from an AC power supply 2 into DC power, further converts the DC power into AC power, and drives an electric motor 3, which is a load.

The power supply device 1 includes an input unit 4 to which AC power is input from the AC power supply 2. The input unit 4 includes a switch unit 41, one end of which is connected to one end of the AC power supply 2, and a noise filter 42 connected to the other end of the switch unit 41 and the other end of the AC power supply 2.

Note that, in the first embodiment, a connecting portion of the one end of the AC power supply 2 and the one end of the switch unit 41 is referred to as terminal L and a connecting portion of the other end of the AC power supply 2 and the noise filter 42 is referred to as terminal N.

The noise filter 42 includes a coil 421, which is an inductive element, and a capacitor 422, which is a capacitive element. One end of the coil 421 is connected to the terminal N. One end of the capacitor 422 is connected to the other end of the first switch unit 41. The other end of the capacitor 422 is connected to the other end of the coil 421. The switch unit 41 is in an OFF state at an initial time.

The coil 421 can suppress a leak of high-frequency noise in a normal mode, can suppress noise in a common mode, and can suppress noise in both of the normal mode and the common mode.

When the switch unit 41 is in an OFF state, the one end of the capacitor 422 and the terminal L are disconnected. Therefore, the first switch unit 41 has a function of suppressing reactive power generated when AC power is supplied to the capacitor 422.

The power supply device 1 includes a first rectifying unit 5 that converts AC power passed through the input unit 4 into DC power. A diode bridge is illustrated as the first rectifying unit 5.

The power supply device 1 includes a power-factor improving unit 6 that improves a power factor of DC power output from the first rectifying unit 5, reduces power supply harmonics of a DC voltage output from the first rectifying unit 5, and boosts the DC voltage output from the first rectifying unit 5.

The power-factor improving unit 6 includes a reactor 61, one end of which is connected to an output end on a high-potential side of the first rectifying unit 5. The reactor 61 is an inductive element that stores energy generated by an electric current passed through the first rectifying unit 5.

The power-factor improving unit 6 includes a semiconductor switch element 62, one end of which is connected to the other end of the reactor 61. The semiconductor switch element 62 causes a power-supply short-circuit to feed a short-circuit current to the reactor 61.

The power-factor improving unit 6 includes a diode 63, an anode of which is connected to the other end of the reactor 61. The diode 63 is a rectifying element that supplies the energy stored in the reactor 61 to a first power storage unit 7.

The reactor 61, the semiconductor switch element 62, and the diode 63 configure a boost chopper circuit.

The power-factor improving unit 6 includes a current detecting unit 64 connected between the semiconductor switch element 62 and an output end on a low-potential side of the first rectifying unit 5. The current detecting unit 64 detects an electric current flowing to the semiconductor switch element 62.

The power supply device 1 includes the first power storage unit 7 that stores DC power passed through the power-factor improving unit 6. A capacitor is illustrated as the first power storage unit 7. The DC power stored in the first power storage unit 7 is supplied to a load side.

The power supply device 1 includes a power converting unit 8 that converts the DC power stored in the first power storage unit 7 into AC power having a desired voltage and a desired frequency and supplies the AC power to the electric motor 3. A three-phase inverter circuit is illustrated as the power converting unit 8.

The power supply device 1 includes a charging unit 21 connected between the terminal N and one end on the high-potential side of the first power storage unit 7. The charging unit 21 can store DC power in the first power storage unit 7 not through the noise filter 42.

The charging unit 21 is configured by connecting a charging switch unit 211, a charging resistor 212, which is a resistive element, and a diode 213, which is a rectifying element, in series. The charging switch unit 211 is in an OFF state at the initial time.

When the charging switch unit 211 is in an ON state, an electric current flows through a route of the terminal L, the charging switch unit 211, the charging resistor 212, the diode 213, the first power storage unit 7, and the terminal N. Electric power is stored in the first power storage unit 7.

The charging resistor 212 has a function of suppressing a rush current that flows when electric power is stored in the first power storage unit 7. Consequently, it is unnecessary to connect a charging resistor to the switch unit 41 in parallel.

The power supply device 1 includes a second rectifying unit 11 that converts AC power of the AC power supply 2 into DC power and a second power storage unit 12 in which the DC power passed through the second rectifying unit 11 is stored.

The second rectifying unit 11 includes a diode 111, which is a rectifying element. A capacitor, which is a capacitive element, is illustrated as the second power storage unit 12. An anode of the diode 111 is connected to the terminal L. A cathode of the diode 111 is connected to one end on the high-potential side of the second power storage unit 12. The other end on the low-potential side of the second power storage unit 12 is connected to the terminal N through the power-factor improving unit 6, the first rectifying unit 5, and the input unit 4.

The power supply device 1 includes a control unit 13 that controls the switch unit 41, the semiconductor switch element 62, and the charging switch unit 211 to the ON state and the OFF state and controls the power converting unit 8. The control unit 13 operates using the DC power stored in the second power storage unit 12. The electric current detected by the current detecting unit 64 in the power-factor improving unit 6 is input to the control unit 13.

Figure 2:
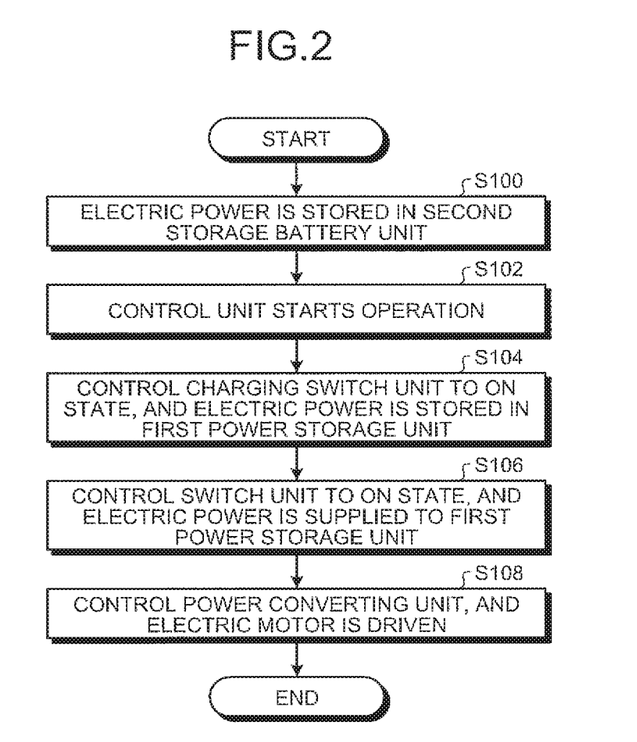
FIG. 2 is a flowchart for explaining the operation of the power supply device according to the first embodiment.

FIG. 2 is a flowchart for explaining the operation of the power supply device according to the first embodiment. When AC power is supplied from the AC power supply 2, the power supply device 1 executes the operation shown in FIG. 2.

When AC power is supplied from the AC power supply 2 to the power supply device 1, at step S100, an electric current flows through a route that passes through the terminal L, the second rectifying unit 11, the second power storage unit 12, and the terminal N. Electric power is stored in the second power storage unit 12. The DC power is stored in the second power storage unit 12 is only in a period in which the potential of the terminal L is higher than the potential of the terminal N. Therefore, a rectifying operation by the second rectifying unit 11 and the first rectifying unit 5 is half-wave rectification.

When the DC power is stored in the second power storage unit 12, at step S102, the control unit 13 starts an operation using the DC power stored in the second power storage unit 12. Note that, at this point, DC power is not stored in the first power storage unit 7.

At step S104, the control unit 13 controls the charging switch unit 211 to the ON state. Consequently, an electric current flows through a route that passes through the terminal L, the charging switch unit 211, the charging resistor 212, the diode 213, the first power storage unit 7, and the terminal N. Electric power is stored in the first power storage unit 7.

When the electric power is stored in the first power storage unit 7, the first power storage unit 7 can feed power to the second power storage unit 12 through the diode 9.

At step S106, the control unit 13 controls the switch unit 41 to the ON state. At this point, the control unit 13 controls the charging switch unit 211 to the OFF state. Consequently, electric power is supplied to the first power storage unit 7 through a route that passes through the noise filter 42, the first rectifying unit 5, and a power-factor improving unit 6. Consequently, suppression of a leak of high-frequency noise by the noise filter 42, improvement of a power factor by ON or OFF control of the semiconductor switch element 62, and boosting of a DC voltage are performed.

At step S108, the control unit 13 starts control of the power converting unit 8. Consequently, the electric motor 3 is driven.

Figure 3:
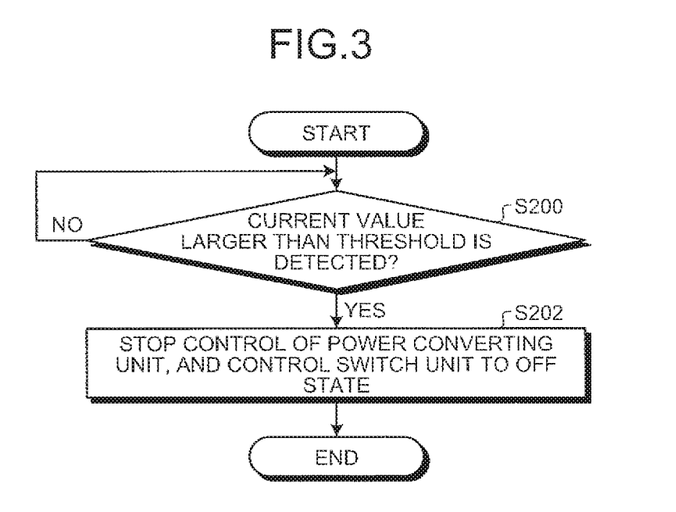
FIG. 3 is a flowchart for explaining the operation of the power supply device according to the first embodiment.

FIG. 3 is a flowchart for explaining the operation of the power supply device according to the first embodiment. The control unit 13 executes processing shown in FIG. 3 during a control operation.

When the semiconductor switch element 62 and the power converting unit 8 are controlled by the control unit 13, if a short-circuit failure of the semiconductor switch element 62 occurs, the current detecting unit 64 detects a short-circuit current.

At step S200, the control unit 13 determines whether an electric current larger than a threshold set in advance is detected by the current detecting unit 64. When determining that an electric current larger than the threshold is not detected by the current detecting unit 64 (No), the control unit 13 stays on standby at step S200.

When determining that an electric current larger than the threshold is detected by the current detecting unit 64 (Yes), the control unit 13 advances the processing to step S202.

At step S202, the control unit 13 stops the control of the power converting unit 8 and controls the switch unit 41 to the OFF state. Consequently, the power supply device 1 can suppress a failure of the power converting unit 8 due to an excessively large current or voltage.

When the switch unit 41 is controlled to the OFF state, a route in which the one end of the capacitor 422 is connected to the second power storage unit 12 through the second rectifying unit 11 is interrupted. That is, the voltage of the capacitor 422 is not superimposed on the second power storage unit 12.

On the other hand, even if the switch unit 41 is controlled to the OFF state, the AC power of the AC power supply 2 is rectified to DC power through a route of the terminal L, the second rectifying unit 11, the second power storage unit 12, and the terminal N. Irrespective of a short-circuit failure of the semiconductor switch element 62, the DC power is supplied to the second power storage unit 12. Therefore, the control unit 13 does not stop the operation.

As explained above, in the power supply device 1 according to the first embodiment, the second rectifying unit 11 is configured by the diode 111, the anode of which is connected to the terminal L and the cathode of which is connected to the second power storage unit 12. Consequently, even when a short-circuit failure of the semiconductor switch element 62 occurs, a route in which the voltage of the capacitor 422 is superimposed on the second power storage unit 12 is suppressed by the second rectifying unit 11. Therefore, the power supply device 1 does not need to set a withstand voltage of the second power storage unit 12 to be twice or more as large as a voltage at normal time. Consequently, in the power supply device 1, it is possible to reduce costs of the second power storage unit 12.

The AC power of the AC power supply 2 is supplied to the second power storage unit 12 through a route unrelated to the short-circuit failure of the semiconductor switch element 62. Consequently, the operation of the control unit 13 is not stopped. The power supply device 1 can continue the operation.

Second Embodiment

In the first embodiment, a rush current flows to the second rectifying unit 11 when power storage in the second power storage unit 12 through the second rectifying unit 11 is started. When a large rush current flows to the diode 111 in the second rectifying unit 11, it is likely that the diode 111 fails. Therefore, to achieve a reduction in the size of the diode 111, it is necessary to achieve suppression of the rush current. A second embodiment achieves suppression of the rush current to the diode 111.

Figure 4:
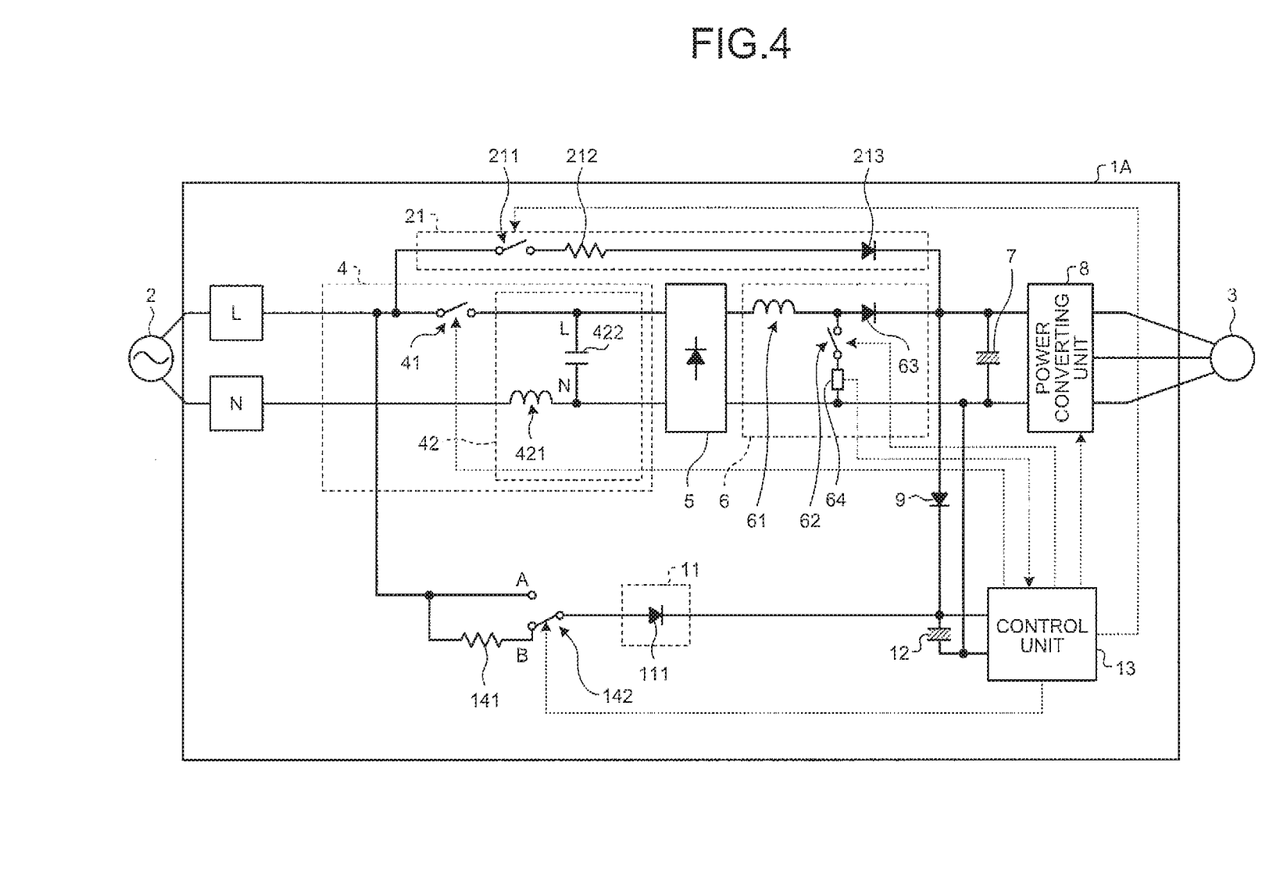
FIG. 4 is a diagram showing the configuration of a power supply device according to a second embodiment.

FIG. 4 is a diagram showing the configuration of a power supply device according to the second embodiment. A power supply device 1A further includes, in the configuration of the power supply device 1 according to the first embodiment, a second charging resistor 141 connected to the second rectifying unit 11 in series when an electric current flows and a second charging switch unit 142 controlled by the control unit 13 to switch a route of an electric current flowing to the second rectifying unit 11 to a route that passes through the second charging resistor 141 or a route that does not pass through the second charging resistor 141.

One end of the second charging resistor 141 is connected to the terminal L. One end of the second charging switch unit 142 is connected to the anode of the diode 111. The other end of the second charging switch unit 142 is switched and connected to a contact A on the one end side of the second charging resistor 141 or a contact B on the other end side of the second charging resistor 141. The second charging switch unit 142 is connected to the contact B side at initial time.

Figure 5:
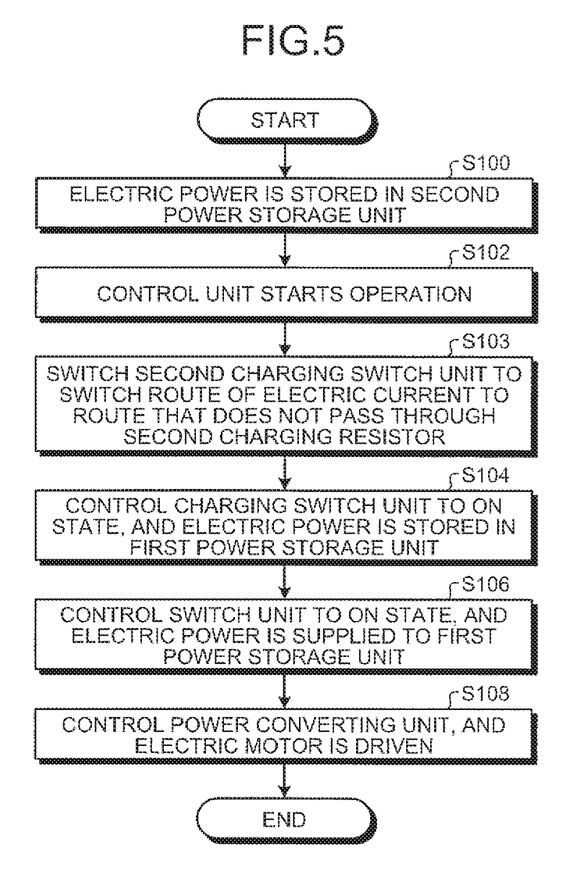
FIG. 5 is a flowchart for explaining the operation of the power supply device according to the second embodiment.

FIG. 5 is a flowchart for explaining the operation of the power supply device according to the second embodiment. When AC power is supplied from the AC power supply 2, the power supply device 1A executes an operation shown in FIG. 5.

Steps S100, S102, S104, S106, and S108 of the flowchart shown in FIG. 5 are the same as the steps of the flowchart shown in FIG. 2 according to the first embodiment. The flowchart shown in FIG. 5 includes step S103 between step S102 and step S104.

When AC power is supplied from the AC power supply 2 to the power supply device 1, at step S100, an electric current flows through a route that passes through the terminal L, the second charging resistor 141, the second charging switch unit 142, the second rectifying unit 11, the second power storage unit 12, and the terminal N. Electric power is stored in the second power storage unit 12.

At this point, because the second charging resistor 141 is present in the route through which a direct current flows, a rush current flowing to the second power storage unit 12 passes through the second charging resistor 141. Therefore, a peak value of the rush current is suppressed by the second charging resistor 141. Consequently, it is possible to suppress a large current from flowing to the diode 111 of the second rectifying unit 11.

When DC power is stored in the second power storage unit 12, at step S102, the control unit 13 starts an operation using the DC power stored in the second power storage unit 12.

At step S103, the control unit 13 performs control for switching the second charging switch unit 142 such that the other end of the second charging switch unit 142 is connected to the contact A. Consequently, the control unit 13 switches a route of an electric current for storing electric power in the second power storage unit 12 to a route that does not pass through the second charging resistor 141 and passes through the terminal L, the second charging switch unit 142, the second rectifying unit 11, the second power storage unit 12, and the terminal N.

In a period in which DC power is not stored in the first power storage unit 7, supply of the DC power to the second power storage unit 12 is performed through the route that passes through the second rectifying unit 11. At step S103, the supply of the DC power to the second power storage unit 12 is performed through the route that does not pass through the second charging resistor 141, whereby a power loss in the second charging resistor 141 is suppressed.

Explanation of step S104 and subsequent steps is omitted because the steps are the same as the steps in the first embodiment.

As explained above, the power supply device 1A according to the second embodiment includes the second charging resistor 141. Therefore, it is possible to suppress a large current from flowing to the second rectifying unit 11. Consequently, in the power supply device 1A, it is possible to reduce the size of the diode 111 of the second rectifying unit 11. Therefore, in the power supply device 1A, it is possible to reduce the costs of the second rectifying unit 11.

When the control unit 13 starts an operation using the DC power stored in the second power storage unit 12, the control unit 13 performs control for switching the second charging switch unit 142 such that the other end of the second charging switch unit 142 is connected to the contact A. Consequently, the control unit 13 switches a route of an electric current for storing electric power in the second power storage unit 12 to a route that does not pass through the second charging resistor 141 and passes through the terminal L, the second charging switch unit 142, the second rectifying unit 11, the second power storage unit 12, and the terminal N. Therefore, in the power supply device 1A, it is possible to suppress a power loss in the second charging resistor 141.

Note that the second charging resistor 141 only has to be disposed to be connected to the second rectifying unit 11 in series when an electric current flows to the second charging resistor 141. Specifically, the second charging resistor 141 can be disposed between the second rectifying unit 11 and the second power storage unit 12.

The connection of the second charging resistor 141 and the second charging switch unit 142 is not limited to the configuration shown in FIG. 4.

Figure 6:
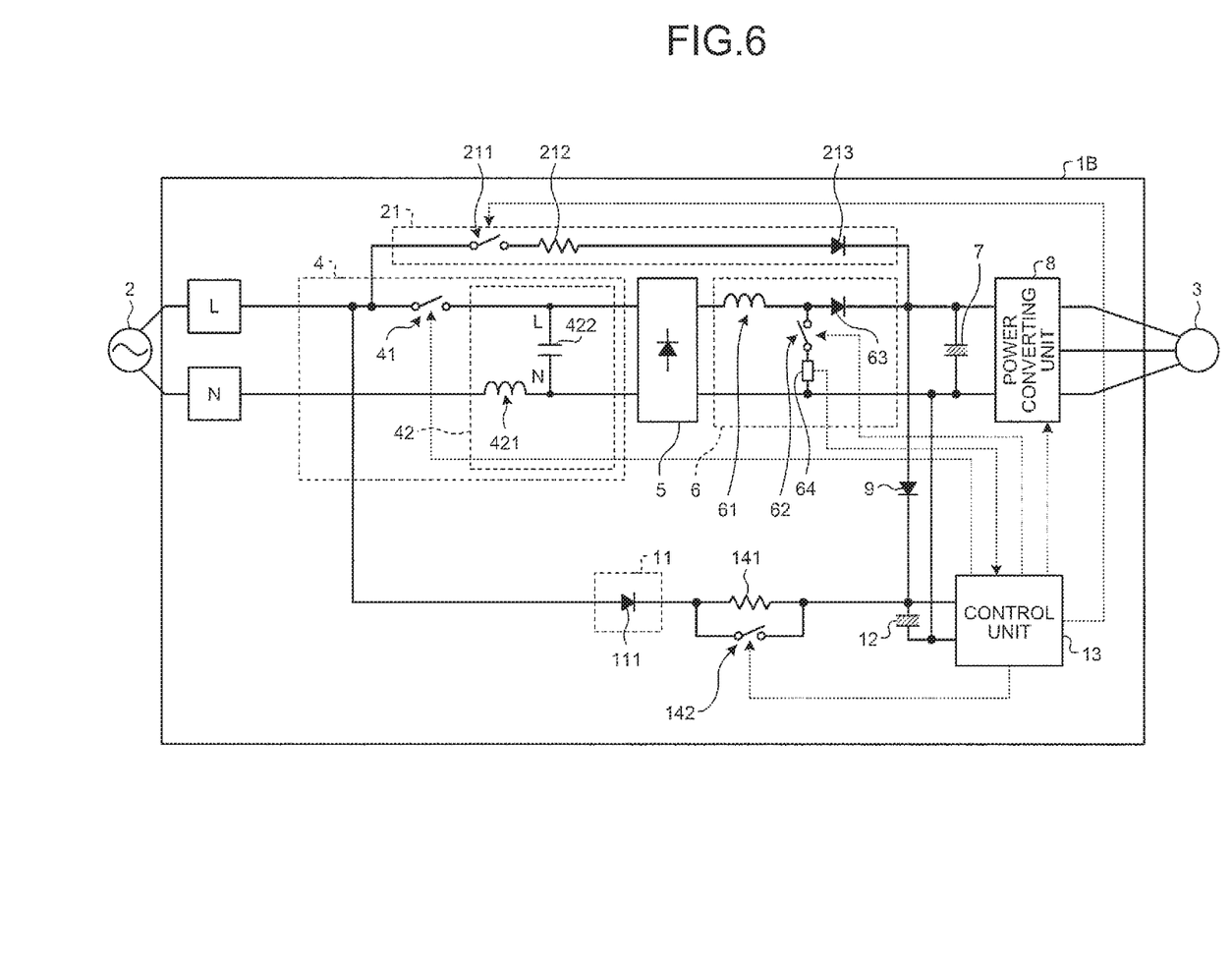
FIG. 6 is a diagram showing the configuration of another example of the power supply device according to the second embodiment.

FIG. 6 is a diagram showing the configuration of another example of the power supply device according to the second embodiment. In a power supply device 1B, the second charging resistor 141 is connected in series between the second rectifying unit 11 and the second power storage unit 12. The second charging switch unit 142 is connected to the second charging resistor 141 in series. The second charging switch unit 142 is in the OFF state at initial time.

When AC power is supplied from the AC power supply 2 to the power supply device 1, an electric current flows through a route that passes through the terminal L, the second rectifying unit 11, the second charging resistor 141, the second power storage unit 12, and the terminal N. Electric power is stored in the second power storage unit 12.

At this point, because the second charging resistor 141 is present in the route through which a direct current flows, a rush current flowing to the second power storage unit 12 passes through the second charging resistor 141. Therefore, a peak value of the rush current is suppressed by the second charging resistor 141. Consequently, it is possible to suppress a large current from flowing to the diode 111 of the second rectifying unit 11.

When DC power is stored in the second power storage unit 12, the control unit 13 starts an operation using the DC power stored in the second power storage unit 12.

After starting the operation, the control unit 13 performs control for switching the second charging switch unit 142 to the ON state. Consequently, the control unit 13 switches the route of the electric current for storing electric power in the second power storage unit 12 to a route that does not pass through the second charging resistor 141 and passes through the terminal L, the second rectifying unit 11, the second charging switch unit 142, the second power storage unit 12, and the terminal N.

In a period in which DC power is not stored in the first power storage unit 7, supply of the DC power to the second power storage unit 12 is performed through the route that passes through the second rectifying unit 11. The supply of the DC power to the second power storage unit 12 is performed through the route that does not pass through the second charging resistor 141, whereby a power loss in the second charging resistor 141 is suppressed.

As explained above, the power supply device 1B according to the second embodiment includes the second charging resistor 141. Therefore, it is possible to suppress a large current from flowing to the second rectifying unit 11. Consequently, in the power supply device 1B, it is possible to reduce the size of the diode 111 of the second rectifying unit 11. Therefore, in the power supply device 1B, it is possible to reduce the costs of the second rectifying unit 11.

When the control unit 13 starts an operation using the DC power stored in the second power storage unit 12, the control unit 13 performs control for switching the second charging switch unit 142 to the ON state. Consequently, the control unit 13 switches the route of the electric current for storing electric power in the second power storage unit 12 to the route that does not pass through the second charging resistor 141 and passes through the terminal L, the second charging switch unit 142, the second rectifying unit 11, the second power storage unit 12, and the terminal N. Therefore, in the power supply device 1B, it is possible to suppress a power loss in the second charging resistor 141.

Note that the second charging resistor 141 only has to be disposed to be connected to the second rectifying unit 11 in series. Specifically, the second charging resistor 141 can be disposed between the terminal L and the second rectifying unit 11.

Third Embodiment

Figure 7:
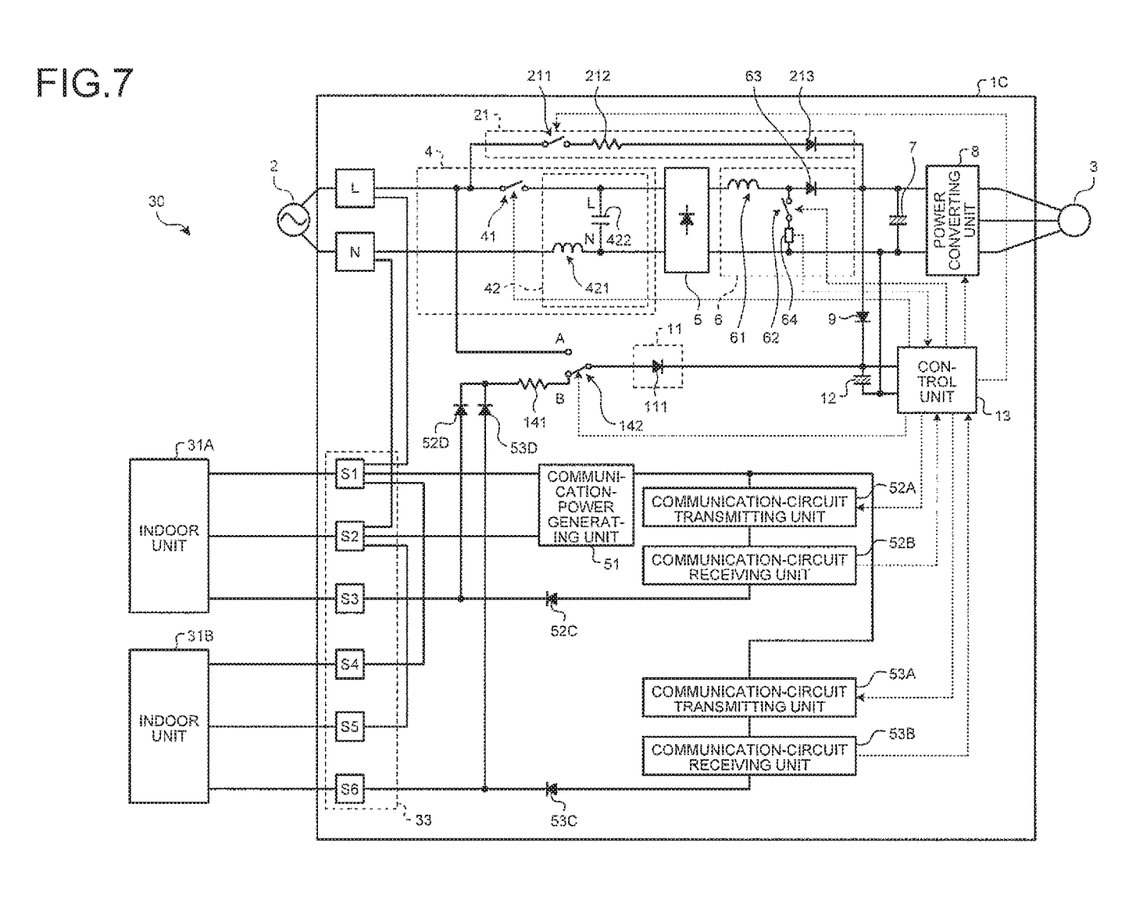
FIG. 7 is a diagram showing the configuration of an air conditioner according to a third embodiment.

FIG. 7 is a diagram showing the configuration of an air conditioner according to a third embodiment. An air conditioner 30 includes a power supply device 1C and indoor units 31A and 31B.

In the power supply device 1C, a circuit for connecting the power supply device 1C to the indoor units 31A and 31B is added to the configuration of the power supply device 1B according to the second embodiment. The power supply device 1C further includes, in addition to the components of the power supply device 1B, an indoor-unit connecting unit 33 including a plurality of terminals to which the indoor units 31A and 31B are connected, communication-circuit transmitting units 52A and 53A and communication-circuit receiving units 52B and 53B for communicating with the indoor units 31A and 31B, a communication-power generating unit 51 that generates electric power used by the communication-circuit transmitting units 52A and 53A and the communication-circuit receiving units 52B and 53B, and diodes 52C and 52E and 53C and 53D.

The indoor-unit connecting unit 33 includes terminals S1, S2, S3, S4, S5, and S6. The terminal S1 is connected to the terminal L. The terminal S2 is connected to the terminal N. AC power is supplied to the indoor unit 31A through the terminals S1 and S2. The terminal S4 is connected to the terminal L via the terminal S1. The terminal S5 is connected to the terminal N via the terminal S2. AC power is supplied to the indoor unit 31B through the terminals S4 and S5.

The communication-power generating unit 51 generates, using AC power supplied through the terminal S1 and the terminal S2, electric power used by the communication-circuit transmitting units 52A and 53A and the communication-circuit receiving units 52B and 53B.

An anode of the diode 52C is connected to the communication-circuit receiving unit 52B and a cathode of the diode 52C is connected to the terminal S3. An anode of the diode 53C is connected to the communication-circuit receiving unit 53B and a cathode of the diode 53C is connected to the terminal S6.

An anode of the diode 52D is connected to the terminal S3. An anode of the diode 53D is connected to the terminal S6. A cathode of the diode 52D and a cathode of the diode 53D are connected in common and connected to the one end of the second charging resistor 141.

Note that, in the power supply device 1C, unlike the power supply device 1A according to the second embodiment, the one end of the second charging resistor 141 is not connected to the terminal L.

Figure 8:
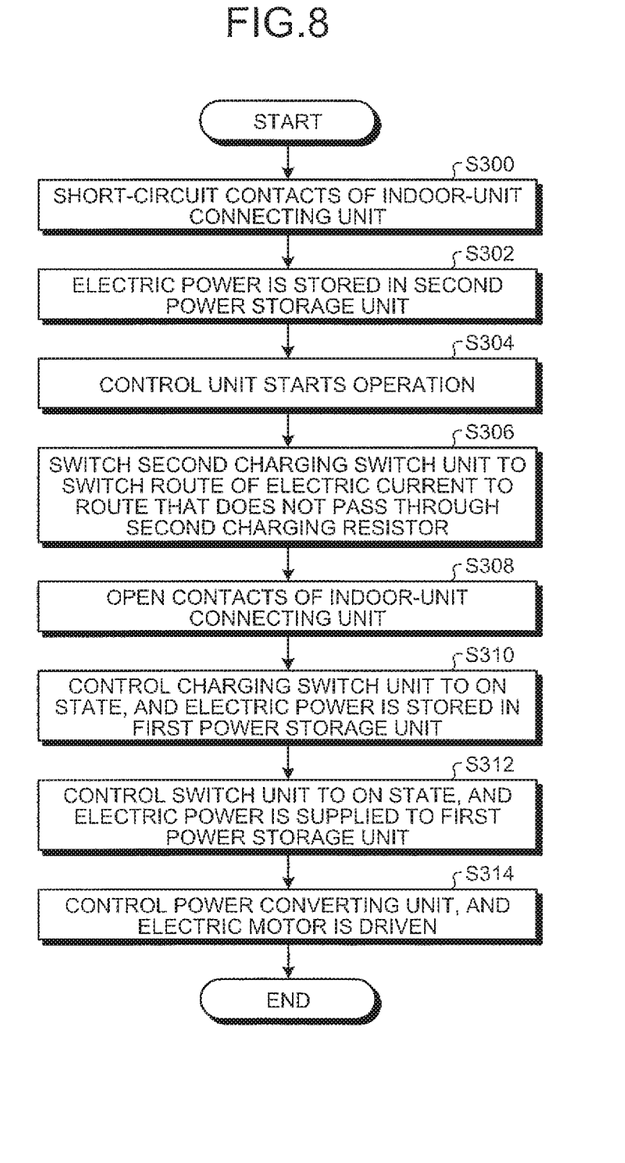
FIG. 8 is a flowchart for explaining the operation of the air conditioner according to the third embodiment.

FIG. 8 is a flowchart for explaining the operation of the air conditioner according to the third embodiment.

When AC power is supplied to the air conditioner 30, because a current route for storing DC power in the first power storage unit 7 and the second power storage unit 12 is not formed, DC power is not stored in the first power storage unit 7 and the second power storage unit 12. Because electric power is not supplied to the control unit 13, the control unit 13 does not start an operation. Therefore, the other end of the second charging switch unit 142 stays in an initial state in which the other end is connected to the terminal B on the second charging resistor 141 side. On the other hand, electric power is supplied to the indoor unit 31A via the terminals S1 and S2 and electric power is supplied to the indoor unit 31B via the terminals S4 and S5.

When the air conditioner 30 starts the operation, at step S300, the indoor unit 31A performs control for short-circuiting the terminal S1 and the terminal S3 in the indoor-unit connecting unit 33 by connecting contacts included in the inside of the indoor unit 31A. Alternatively, at step S300, the indoor unit 31B performs control for short-circuiting the terminal S4 and the terminal S6 in the indoor-unit connecting unit 33 by connecting contacts included in the inside of the indoor unit 31B.

When the terminal S1 and the terminal S3 in the indoor-unit connecting unit 33 are short-circuited, at step S302, an electric current flows through a route that passes through the terminal L, the terminal S1, the terminal S3, the diode 52D, the second charging resistor 141, the second rectifying unit 11, the second power storage unit 12, and the terminal N. Electric power is stored in the second power storage unit 12. Alternatively, when the terminal S4 and the terminal S6 in the indoor-unit connecting unit 33 are short-circuited, at step S302, an electric current flows through a route that passes through the terminal L, the terminal S4, the terminal S6, the diode 53D, the second charging resistor 141, the second rectifying unit 11, the second power storage unit 12, and the terminal N. Electric power is stored in the second power storage unit 12.

At this point, because the second charging resistor 141 is present in the route through which a direct current flows, a rush current flowing to the second power storage unit 12 passes through the second charging resistor 141. Therefore, a peak value of the rush current is suppressed by the second charging resistor 141. Consequently, it is possible to suppress a large current from flowing to the diode 111 of the second rectifying unit 11.

When DC power is stored in the second power storage unit 12, at step S304, the control unit 13 starts an operation using the DC power stored in the second power storage unit 12.

At step S306, the control unit 13 performs control for switching the second charging switch unit 142 such that the other end of the second charging switch unit 142 is connected to the contact A. Consequently, the control unit 13 switches a route of an electric current for storing electric power in the second power storage unit 12 to a route that does not pass through the second charging resistor 141 and passes through the terminal L, the second charging switch unit 142, the second rectifying unit 11, the second power storage unit 12, and the terminal N.

In a period in which DC power is not stored in the first power storage unit 7, supply of DC power to the second power storage unit 12 is performed through the route that passes through the second rectifying unit 11. At step S306, the supply of the DC power to the second power storage unit 12 is performed through the route that does not pass through the second charging resistor 141, whereby a power loss in the second charging resistor 141 is suppressed.

At step S308, to perform exchange of communication signals between the indoor unit 31A and the control unit 13 via the terminal S3, the indoor unit 31A opens the contacts included in the inside of the indoor unit 31A to thereby perform an operation for opening the terminal S1 and the terminal S3 in the indoor-unit connecting unit 33. Alternatively, at step S308, to perform exchange of communication signals between the indoor unit 31B and the control unit 13 via the terminal S6, the indoor unit 31B opens the contacts included in the inside of the indoor unit 31B to thereby perform an operation for opening the terminal S4 and the terminal S6 in the indoor-unit connecting unit 33.

At this point, because the route of the electric current for storing electric power in the second power storage unit 12 is formed to pass through the terminal L, the second charging switch unit 142, the second rectifying unit 11, the second power storage unit 12, and the terminal N, the control unit 13 can continue the operation.

Explanation of steps S310, S312, and S314 is omitted because the steps are the same as steps S104, S106, and S108 in FIG. 5.

When the operation of the air conditioner 30 is not performed, DC power is not stored in the second power storage unit 12 and the control unit 13 does not operate. Therefore, only the indoor units 31A and 31B consume electric power when the operation of the air conditioner 30 is not performed. In the power supply device 1C, it is possible to suppress power consumption.

As explained above, the air conditioner 30 according to the third embodiment is configured by the power supply device 1C and the indoor units 31A and 31B. The diodes 52D and 53D are connected to the circuit that performs transmission and reception of communication signals between the indoor units 31A and 31B and the control unit 13. The cathodes of the diodes 52D and 53D are connected to the second charging resistor 141. Consequently, when the operation of the air conditioner 30 is not performed, DC power is not stored in the second power storage unit 12 and the control 13 does not operate. Therefore, in the power supply device 1C, it is possible to reduce power consumption.

When the operation of the air conditioner 30 is started, DC power is stored in the second power storage unit 12 by operations of the contacts on the inside of the indoor units 31A and 31B. The control unit 13 can start an operation. Further, the control unit 13 switches the contacts of the second charging switch unit 142 and forms a route for supplying DC power from the terminal L to the second power storage unit 12. Therefore, it is possible to continue the operation irrespective of the operations of the contacts on the inside of the indoor units 31A and 31B after that.

The configurations explained in the embodiments above indicate an example of contents of the present invention and can be combined with other publicly-known technologies. A part of the configurations can be omitted or changed in a range not departing from the spirit of the present invention.

The invention claimed is:

1. A power supply device comprising:
   an input circuit to which AC power is input from an AC power supply;
   a first rectifier that converts the AC power passed through the input circuit into DC power;
   a power-factor improvement circuit that improves a power factor of the DC power output from the first rectifier;
   a first electric accumulator that stores the DC power passed through the power-factor improvement circuit and supplies the stored DC power to a load side;
   a second rectifier connected to a portion where the input circuit is connected to the AC power supply, the second rectifier converting the AC power into the DC power;
   a second electric accumulator that stores the DC power passed through the second rectifier, the second electric accumulator being connected to the power-factor improvement circuit in parallel to the first electric accumulator; and
   a controller that operates using the electric power stored in the second electric accumulator and, when a short-circuit failure occurs in the power-factor improvement circuit, performs control for interrupting the input circuit to interrupt a route that leads to the input circuit passing through the second rectifier, the second electric accumulator, the power-factor improvement circuit, and the first rectifier in order from the input circuit.

2. The power supply device according to claim 1, wherein the input circuit includes:
   a switcher, one end of which is connected to one end of the AC power supply, the switcher being controlled to an ON state and an OFF state by the controller; and
   a noise filter connected to another end of the switch unit and another end of the AC power supply.

3. The power supply device according to claim 1, further comprising a charging resistor connected to the second rectifier in series when an electric current flows, the charging resistor suppressing a peak value of the electric current.

4. The power supply device according to claim 3, further comprising a charging switcher controlled by the controller to switch a route of an electric current flowing to the second rectifier to a route that passes through the charging resistor or a route that does not pass through the charging resistor, wherein
   after starting an operation using the DC power stored in the second electric accumulator, the controller performs control for switching the charging switcher to switch the route of an electric current flowing to the second rectifier to the route that does not pass through the charging resistor.

5. An air conditioner comprising a power supply device and an indoor processor, wherein
   the power supply device includes:
   an input circuit to which AC power is input from an AC power supply;
   a first rectifier that converts the AC power passed through the input circuit into DC power;
   a power-factor improvement circuit that improves a power factor of the DC power output from the first rectifier;
   a first electric accumulator that stores the DC power passed through the power-factor improvement circuit and supplies the stored DC power to a load side;
   a charging resistor that suppresses a peak value of an electric current;
   a second rectifier that converts the AC power into the DC power;
   a charging switcher that connects the charging resistor and the second rectifier or a portion where the input circuit is connected to the AC power supply and the second rectifier;
   a second electric accumulator that stores the DC power passed through the second rectifier, the second electric accumulator being connected to the power-factor improvement circuit in parallel to the first electric accumulator; and
   a controller that operates using the electric power stored in the second electric accumulator and, when a short-circuit failure occurs in the power-factor improvement circuit, performs control for interrupting the input circuit to interrupt a route that leads to the input circuit passing through the second rectifier, the second electric accumulator, the power-factor improvement circuit, and the first rectifier in order from the input circuit, and
   the indoor processor performs control for feeding an electric current to the charging resistor when starting operation.

6. The air conditioner according to claim 5, wherein the charging switcher connects a communication circuit, which communicates with the indoor processor, and the second rectifier when the controller does not operate.

7. The air conditioner according to claim 5, wherein, after starting an operation using the DC power stored in the second electric accumulator, the controller performs control for switching the charging switcher to connect a portion where the input circuit is connected to the AC power supply and the second rectifier.

\* \* \* \* \*